United States Patent [19]

Inoue et al.

[11] Patent Number: 4,587,318

[45] Date of Patent: May 6, 1986

[54] ETHYLENE COPOLYMER COMPOSITIONS FOR ROTATIONAL MOLDING

[75] Inventors: Takashi Inoue, Yokohama; Mituji Miyoshi, Fujisawa; Kazuo Matsuura; Kaoru Yamamoto, both of Tokyo, all of Japan

[73] Assignee: Nippon Petrochemicals Company, Limited, Tokyo, Japan

[21] Appl. No.: 694,647

[22] Filed: Jan. 24, 1985

[30] Foreign Application Priority Data

Jan. 27, 1984 [JP] Japan .................. 59-12120

[51] Int. Cl.$^4$ .................. C08F 8/00
[52] U.S. Cl. .................. 526/282; 264/310; 525/331.7; 525/332.1
[58] Field of Search .......... 526/282; 264/310

[56] References Cited

U.S. PATENT DOCUMENTS

| | | | |
|---|---|---|---|
| 3,489,733 | 1/1970 | Natta | 526/282 |
| 4,025,497 | 5/1977 | Natta | 526/282 |
| 4,156,767 | 5/1979 | Hall | 526/282 |
| 4,267,080 | 5/1981 | Yokoyama | 264/310 |
| 4,390,677 | 6/1983 | Karol | 264/310 |

Primary Examiner—Paul R. Michl
Attorney, Agent, or Firm—Stevens, Davis, Miller & Mosher

[57] ABSTRACT

Provided is an ethylene copolymer composition for rotational molding, comprising a copolymer of a predominant ethylene and 0.02 to 1 mole % of a non-conjugated diene represented by the following formula (I) or (II) or a derivative thereof:

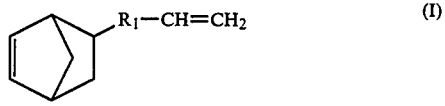

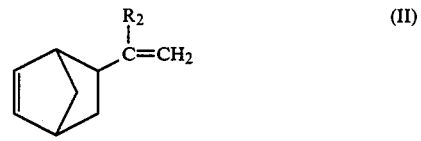

wherein $R_1$ is an alkylene group having one or two carbon atoms and $R_2$ is hydrogen or an alkyl group having one or two carbon atoms, and an organic peroxide, said copolymer having a melt index of 2 to 50 g/10 min, a density of 0.930 to 0.970 g/cm$^3$ and a maximum peak temperature (Tm) measured according to Differential Scanning Calorimetry (DSC) of not lower than 100° C.

6 Claims, No Drawings

ETHYLENE COPOLYMER COMPOSITIONS FOR ROTATIONAL MOLDING

BACKGROUND OF THE INVENTION

The present invention relates to a crosslinkable ethylene copolymer composition for rotational molding. More particularly, the present invention is concerned with a crosslinkable ethylene copolymer composition for rotational molding, substantially free of air bubbles formed in rotational molding and capable of affording molded products superior in impact resistance.

Heretofore, the rotational molding method has widely been used for the production of hollow containers and other products of large size and complicated structure which cannot be molded by the blow molding method, such as, for example, gasoline tanks, casks, storage tanks and windsurfing boards.

The rotational molding method comprises the steps of feeding a synthetic resin powder to a mold, heating the mold from the exterior while rotating the mold uniaxially or biaxially to melt the powder, thereby forming a molten synthetic resin layer within the mold, then cooling the mold to solidify the synthetic resin layer and removing the mold from the thus-molded product.

The rotational molding method is simply based on the principle that a molten resin flows with rotation of a mold to form a molten resin layer on the mold surface. Therefore, it is necessary to use a resin having a good fluidity, or else it will be impossible to obtain a molded product having a good appearance, for example, the molded product obtained will contain air bubbles or have an uneven inner surface. Thus, it is important to use a resin having superior melt-flow characteristics capable of forming a uniform layer.

On the other hand, the resultant molded product is required to have superior physical properties such as high impact strength and resistance to environmental stress cracking.

As a method of satisfying both such superior fluidity and superior physical properties of product, it has heretofore been known to incorporate a cross-linking agent, e.g. a peroxide, into a polyethylene composition. According to this known method, polyethylene first becomes fluidized and provide a uniform coating over the mold inner surface and is then crosslinked by the peroxide, whereby the physical properties of the final product are improved.

In an effort to improve the impact strength and other physical properties, there has also been proposed a composition containing, in addition to polyethylene, rubber or elastomer, a crosslinking assistant such as 1,2-polybutadiene and a crosslinking agent (see Japanese Patent Laid Open Nos. 56143/1980, 135848/1982 and 147445/1983). Having made studies on this respect, the present inventors found that the addition of such crosslinking assistant as 1,2-polybutadiene could greatly increase the crosslinking efficiency and afford bubble-free rotational moldings, but caused a marked reduction of impact strength.

It has also been known that the impact strength can be improved by the addition of rubber or elastomer. However, the addition of such substance causes reduction of rigidity, and this reduction of rigidity is a serious problem particularly in large-sized moldings which are produced mainly by the rotational molding method.

SUMMARY OF THE INVENTION

It is the object of the present invention to provide ethylene copolymer compositions capable of increasing the crosslinking efficiency and affording rotational moldings having an improved impact strength.

The present invention resides in an ethylene copolymer composition for rotational molding, comprising a copolymer of a predominant ethylene and 0.02 to 1 mole % of a non-conjugated diene represented by the following formula (I) or (II) or a derivative thereof:

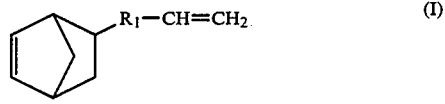

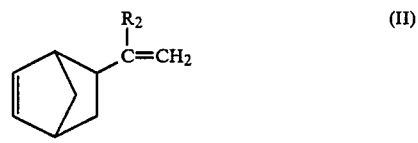

wherein $R_1$ is an alkylene group having one or two carbon atoms and $R_2$ is hydrogen or an alkyl group having one or two carbon atoms, and an organic peroxide, said copolymer having a melt index of 2 to 50 g/10 min, a density of 0.930 to 0.970 g/cm$^3$ and a maximum peak temperature (Tm) measured according to Differential Scanning Calorimetry (DSC) of not lower than 100° C.

DESCRIPTION OF THE PREFERRED EMBODIMENTS

As to the non-conjugated diene which is one of the comonomers of the ethylene copolymer used in the present invention, 5-vinyl-2-norbornene, 5-propenyl-2-norbornene and 5-(1-methylpropenyl)-2-norbornene are mentioned as examples of the non-conjugated diene of the formula (I), and 5-isopropenyl2-norbornene and 5-(1-ethylvinyl)-2-norbornene are mentioned as examples of the non-conjugated diene of the formula (II). And as examples of derivatives thereof are mentioned those derived from substitution of hydrogen on the ring, e.g. 5-isopropenyl-6-chloromethyl-2-norbornene. Most preferred is 5-vinyl-2-norbornene.

The content of the non-conjugated diene is in the range of 0.02 to 1 mole %, preferably 0.05 to 0.5 mole %, based on the total amount of monomers of the ethylene copolymer. If it is less than 0.02 mole %, the crosslinkability of the copolymer will be poor and the resultant molded product may contain air bubbles. And if it exceeds 1 mole %, the cross-linking efficiency will reach saturation, that is, no contribution is made to the improvement in physical properties of the resultant molded product, and thus a non-conjugated diene content exceeding 1 mole % is uneconomical, and rather the weatherability is deteriorated by the double bond remaining after crosslinking.

The ethylene copolymer used in the present invention is prepared by copolymerizing ethylene as a predominant component with the non-conjugated diene. In this case, an α-olefin having 3 to 10 carbon atoms such as, for example, propylene, butene-1, hexene-1, 4-methylpentene-1, octene-1, decene-1, or a mixture thereof, may be copolymerized with ethylene together with the non-conjugated diene. In this case, it is preferable that the α-olefin content of the copolymer be not more than 3 mole %. Thus, the copolymer referred to herein has the same meaning as "interpolymer".

The ethylene copolymer is prepared according to an ionic polymerization process using a Ziegler type catalyst. For example, it can be obtained in the same way as in the conventional olefin polymerization reaction using a Ziegler type catalyst, in the presence of a catalyst which comprises the combination of a solid catalyst component containing at least magnesium and titanium with an organoaluminum compound. The solid catalyst component can be prepared, for example, by supporting in a known manner a titanium compound on an inorganic solid compound containing magnesium. Examples of such inorganic solid compound are, in addition to metal magnesium, magnesium hydroxide, magnesium carbonate, magnesium oxide, magnesium chloride, as well as double salts, double oxides, carbonates, chlorides and hydroxides containing magnesium atom and a metal selected from silicon, aluminum and calcium. Further, these inorganic solid compounds may be treated or reacted in advance with oxygen-containing compounds, sulfur-containing compounds, aromatic hydrocarbons or halogen-containing substances.

More specifically, the reaction is performed in a substantially oxygen- and water-free condition, in vapor phase, or in the presence of an inert solvent or using monomer per se as solvent. The olefin polymerizing conditions involve temperatures in the range of 20° to 300° C., preferably 40° to 200° C., and pressures in the range of atmospheric pressure to 70 kg/cm$^2$.G, preferably 2 to 60 kg/cm$^2$.G. The molecular weight adjustment can be made to some extent by changing polymerization conditions such as the polymerization temperature and the catalyst mole ratio. But, the addition of hydrogen into the polymerization system is more effective for this purpose. Moreover, two or more stage polymerization reactions involving different polymerization conditions such as different hydrogen concentrations and different polymerization temperatures can be performed without any trouble.

Among the ethylene copolymers thus prepared, those having a melt index of 2 to 50 g/10 min, preferably 5 to 20 g/10 min, a density of 0.930 to 0.970 g/cm$^3$, preferably not lower than 0.940 g/cm$^3$, and a maximum peak temperature (Tm) measured according to Differential Scanning Calorimetry (DSC) of not lower than 100° C. are employable for the preparation of the rotational molding composition of the present invention. If the melt index is less than 2 g/10 min, the flow characteristic of molten resin will be markedly deteriorated, thus making it impossible to obtain a molded product having a uniform thickness. And if the melt index exceeds 50 g/10 min, both crosslinking efficiency and impact strength will be reduced.

A density of the copolymer less than 0.930 g/cm$^3$ will lead to deterioration of the rigidity, which causes a trouble particularly in large-sized moldings.

Moreover, the ethylene copolymer used in the invention having a maximum peak temperature (Tm) according to DSC of not lower than 100° C. is clearly distinguished from ethylene-propylene-diene copolymer rubbers presently available commercially. More particularly, conventional ethylene-propylene-diene copolymer rubbers have little crystallinity, and even where a crystalline portion exists, it is an extremely small proportion. Besides, their maximum peak temperatures (Tm) according to DSC are lower than 100° C. This indicates that conventional ethylene-propylenediene copolymer rubbers cannot satisfy the rigidity, oil resistance and other physical properties required of large-sized moldings which are produced mainly by the rotational molding method.

The maximum peak temperature (Tm) measured according to Differential Scanning Calorimetry (DSC) is a value correlated with the crystal form and is measured in the following manner. About 5 mg. of sample is weighed and then set to DSC. The temperature is raised to 170° C. and then cooled to 0° C. at a rate of 2.5° C./min. Then, from this state the temperature is raised to 170° C. at a rate of 10° C./min. The temperature in the vertex position of the maximum peak appearing during the rise of temperature from 0° to 170° C. is regarded as the maximum peak temperature (Tm).

Examples of the organic peroxide used in the invention are dicumyl peroxide, tert-butyl dicumyl peroxide, 2,5-dimethyl-2,5-di(tert-butylperoxy)hexane and 2,5-dimethyl-2,5-di(tert-butylperoxy)hexyne-3. The organic peroxide is used usually in an amount of 0.1 to 5 parts by weight, preferably 0.5 to 3 parts by weight, based on 100 parts by weight of the ethylene copolymer.

The molding temperature is higher than the melting point of the resin, so in the case where an organic peroxide having a decomposition temperature close to the melting point of the resin is used, the crosslinking reaction will proceed before completion of the molding and consequently the surface condition of the resultant molded product will be deteriorated. Therefore, it is desirable to select an organic peroxide having a relatively high decomposition temperature in consideration of the molding temperature.

According to the present invention, a very small amount of the non-conjugated diene of the formula (I) or (II) such as, for example, 5-vinyl-2-norbornene, 5-propenyl-2-norbornene or 5-isopropenyl-2-norbornene, or a derivative thereof, is copolymerized with ethylene, whereby the crosslinking efficiency can be greatly improved. This means the following. The addition of the organic peroxide in a small amount brings about the effect that not only the impact strength and stiffness modulus required of rotational moldings can be improved in a well-balanced state, but also the coloration of the resultant molded product caused by the presence of the organic peroxide can be prevented. Moreover, in the ethylene copolymer preparation, a high catalytic efficiency and a greatly elongated life cycle can be attained.

As the reason why the crosslinking efficiency is enhanced under such low comonomer content, the present inventors have found that in crosslinking the ethylene copolymer with the organic peroxide, the vinyl group, out of the double bonds in the ethylene copolymer, most greatly contribute to the crosslinking. Therefore, in copolymerizing ethylene with the non-conjugated diene of the structural formula (I) or (II) as a comonomer, it is presumed that the double bond in the norbornene ring will react with ethylene and the end vinyl group will remain and contribute to the crosslinking reaction, thereby permitting the organic peroxide even in a small amount to greatly improve the crosslinking efficiency.

On the other hand, in an ethylene copolymer using another non-conjugated diene, for example, an alkylidene norbornene such as 5-ethylidene-2-norbornene, the vinylidene group will remain, and in an ethylene copolymer using an alkenylcyclohexene such as 5-vinylcyclohexene, the double bond in the cyclohexene ring will remain. Further, in an ethylene copolymer using a chain-like non-conjugated diene such as 1,4-hexadiene, a large proportion will remain as vinylene group. It is presumed that in all of these ethylene copolymers, the crosslinking efficiency will be lowered in comparison with the ethylene copolymer used in the present invention. This is supported by the working and comparative examples as will be described later.

In the composition of the present invention, the ethylene copolymer may be used as a blend with another ethylene polymer, examples of which include high-, medium- and low-density polyethylenes, copolymers of ethylene and $C_3$–$C_{10}$ α-olefins, and copolymers of ethylene and monomers having polar groups such as vinyl acetate, acrylic acid, acrylic acid ester and methacrylic acid ester. As to the blending ratio, it is desirable that the polymer blend contain not less than 60 wt. %, preferably not less than 70 wt. %, of the ethylene copolymer used in the invention.

If necessary, known additives such as an anti-aging agent, an ultraviolet absorbing agent, an anti-static agent, a pigment, a crosslinking assistant, a flame retardant, a lubricant, carbon black, rubber and filler may be used in the range not departing from the gist of the present invention.

Examples and Comparative Examples are given below to further illustrate the present invention, but it is to be understood that the invention is not limited thereto.

<Preparation of Ethylene Copolymer>

(a) Preparation of Solid Catalyst Component 10 g. of a commercially available anhydrous magnesium chloride, 2.3 g. of triethoxyboron and 2.5 g. of titanium tetrachloride were placed in a stainless steel pot having an internal volume of 400 ml. and containing 25 stainless steel balls each ½ inch in diameter, and ball-milled at room temperature in a nitrogen atmosphere for 16 hours, then 2.5 g. of tetraethoxysilane was added, followed by a further ball milling for 16 hours, to obtain a solid catalyst component containing 36 mg/g of titanium.

(b) Polymerization

A 20-liter stainless steel autoclave equipped with an induction stirrer was purged with nitrogen and charged with 10 l of hexane, then 10 mmol of triethylaluminum and 100 mg. of the solid catalyst component prepared above were added and the temperature was raised to 90° C. under stirring. The system was pressurized to 2 kg/cm$^2$.G by the vapor pressure of hexane. Hydrogen was introduced to a total pressure of 4.8 kg/cm$^2$.G and then 100 ml. of 5-vinyl-2-norbornene (VBH) was introduced together with ethylene. When the ethylene was introduced to a total pressure of 10 kg/cm$^2$.G, polymerization was started, which was continued for 2 hours while maintaining the internal pressure of the autoclave at 10 kg/cm$^2$.G. Thereafter, the polymer slurry was transferred to a centrifugal separator to separate hexane and then the hexane was removed under reduced pressure to afford 3.5 kg. of a white ethylene copolymer having a melt index (MI) of 6.0 g/10 min, a density of 0.960 g/cm$^3$ and a bulk density of 0.27. Catalytic activity was as follows: 3,370 g/g.cat.hr.$C_2{'}$ pressure, 93,500 g/g.Ti. hr.$C_2{^{40}}$ pressure.

Further, polymerizations were performed in the same way as above except that in place of the above VBH as a comonomer there were used 5-propenyl-2-norbornene (PBH), 5-isopropenyl-2-norbornene (i-PBH), 1,4-hexadiene (1,4-HD), 5-ethylidene-2-norbornene (EBH), 5-vinylcyclohexene (VCH), butadiene and isoprene, to obtain various ethylene copolymers.

<Rotational Molding>

To 100 parts by weight of each ethylene copolymer prepared in the above (b) was added as the organic peroxide 2,5-dimethyl-2,5-di(tert-butylperoxy)hexyne-3 (trade name: Perhexyne 2,5-B, a product of Nippon Oils and Fats Co., Ltd.). After mixing and pelletizing through a 50 mm dia. extruder, the pellets were pulverized into a fine powder for use in the ordinary rotational molding. Then, a predetermined amount of the fine powder was put into a mold, and a rotational molding was conducted for about 30 minutes in a furnace held at 280° C. The resultant molded material was cooled to obtain a cylindrical product having a thickness of 2 mm.

EXAMPLES 1–5 AND COMPARATIVE EXAMPLES 1–4

Rotational-molded products were obtained using as ethylene copolymer components copolymers of ethylene and VBH at various MI, density and comonomer content values, and then evaluated for their appearance and physical properties, results of which are as set out in Table 1. Reference to Table 1 shows that the molded products obtained at comonomer contents outside the range defined in the present invention are poor in all of gel percentage, impact strength and appearance and that the molded product obtained at an MI below the range defined herein is inferior in appearance and the product at an MI above such range is low in both gel percentage and impact strength.

EXAMPLES 6–7 AND COMPARATIVE EXAMPLES 5–10

Rotational-molded products were obtained using as ethylene copolymer components ethylene/5-propenyl-2-norbornene (PBH) and ethylene/5-isopropenyl-2-norbornene (i-PBH) copolymers, and then evaluated in the same way as in Example 1, results of which are as set out in Table 1. Like Example 1, the molded products were superior also in impact strength and appearance.

By way of comparison, rotational-molded products were obtained using ethylene/1,4-HD copolymer (Comparative Example 5), ethylene/EBH copolymer (Comparative Example 6), ethylene/EBH copolymer (Comparative Example 7), a high density polyethylene (HDPE)(trade name: Nisseki Staflene E780, a product of Nippon Petrochemicals Co., Ltd.) alone (Comparative Example 8), ethylene/butadiene copolymer (Comparative Example 9) and ethylene/isoprene copolymer (Comparative Example 10), andd then evaluated in the same way as in Example 1, results of which are as set out in Table 1. Reference to Table 1 shows that the products of Comparative Examples 5–10 are all lower in both gel percentage and impact strength than the molded product obtained using ethylene/VBH copolymer in Example 1. Also as to their appearance, air bubbles were found here and there.

EXAMPLE 8

100 parts by weight of the ethylene copolymer used in Example 1 were mixed with 30 parts by weight of the HDPE used in Comparative Example 8. Using this mixture, a molded product was obtained in the same way as in Example 1 and evaluated for physical properties, results of which were good as shown in Table 1.

COMPARATIVE EXAMPLE 11

To the HDPE used in Comparative Example 8 was added 1.0 wt. % of a liquid polybutadiene (trade name: Nisseki LPBB-2000, a product of Nippon Petrochemicals Co., Ltd.), then a molded product was obtained in the same way as in Example 1 and evaluated for physical properties, results of which are as set out in Table 1.

(3) Impact Strength . . . Each molded product was punched and measured for impact strength by means of a Tensile Impact Tester (a product of Toyo Seiki K. K.) at room temperature (23±1° C.); in this way, an average value of ten samples was obtained (according to ASTM D 1822).

(4) Stiffness modulus . . . Each molded product was punced and measured for stiffness modulus by means of a Stifness Tester (a product of Toyo Seiki K. K.) at room temperature (23±1° C.); in this way, an average value of five samples was obtained (according to ASTM D 747).

TABLE 1

| | Ethylene Copolymer Composition | | | | | | Physical Properties of Molded Product | | | |
|---|---|---|---|---|---|---|---|---|---|---|
| | A Copolymer Comonomer | | MI | Density | DSC Tm | B Ethylene | Composition Ratio A / B (part | Gel Percent- | Impact strength (kg · cm/ | Stiffness Modulus | Appearance |
| Example | Kind | Content (mole %) | (g/10 min) | (g/cm³) | (°C.) | Polymer | by weight) | age (%) | cm²) | (kg/cm²) | Remarks |
| Example 1 | VBH | 0.1 | 6 | 0.960 | 130 | — | 100/0 | 73 | 270 | 3500 | Very good |
| Example 2 | VBH | 0.1 | 10 | 0.963 | 132 | — | 100/0 | 68 | 260 | 3800 | Very good |
| Example 3 | VBH | 0.2 | 20 | 0.963 | 132 | — | 100/0 | 76 | 280 | 3700 | Very good |
| Example 4 | VBH | 0.06 | 6 | 0.960 | 130 | — | 100/0 | 68 | 260 | 3500 | Very good |
| Example 5 | VBH | 0.5 | 30 | 0.956 | 128 | — | 100/0 | 77 | 280 | 3100 | Very good |
| Example 6 | PBH | 0.1 | 0.8 | 0.960 | 130 | — | 100/0 | 70 | 260 | 3500 | Very good |
| Example 7 | iPBH | 0.1 | 10 | 0.960 | 130 | — | 100/0 | 67 | 260 | 3500 | Very good |
| Example 8 | VBH | 0.1 | 6 | 0.969 | 130 | HDPE | 100/30 | 71 | 265 | 3500 | Very good |
| Comparative Example 1 | VBH | 0.01 | 10 | 0.963 | 132 | — | 100/0 | 27 | 95 | 5900 | X (bubble) |
| Comparative Example 2 | VBH | 0.05 | 1 | 0.957 | 128 | — | 100/0 | 78 | 320 | 3200 | X (uneven, poor fluidity) |
| Comparative Example 3 | VBH | 0.1 | 60 | 0.963 | 132 | — | 100/0 | 37 | 70 | 5300 | X (bubble) |
| Comparative Example 4 | VBH | 0.1 | 10 | 0.915 | 118 | — | 100/0 | 76 | 580 | 1100 | very good |
| Comparative Example 5 | 1.4-HD | 0.1 | 10 | 0.960 | 130 | — | 100/0 | 53 | 220 | 3500 | Δ somewhat good |
| Comparative Example 6 | EBH | 0.1 | 10 | 0.963 | 132 | — | 100/0 | 52 | 210 | 3800 | Δ somewhat good |
| Comparative Example 7 | VCH | 0.1 | 10 | 0.960 | 130 | — | 100/0 | 43 | 170 | 3600 | X (bubble) |
| Comparative Example 8 | — | — | — | — | — | HDPE | 0/100 | 34 | 100 | 5900 | X (bubble) |
| Comparative Example 9 | butadiene | 0.1 | 7 | 0.960 | 130 | — | 100/0 | 29 | 97 | 5600 | X (bubble) |
| Comparative Example 10 | isoprene | 0.1 | 10 | 0.960 | 130 | — | 100/0 | 27 | 96 | 5600 | X (bubble) |
| Comparative Example 11 | — | — | 6 | 0.960 | 130 | HDPE | 0/100 | 56 | 120 | 4500 | good |
| Comparative Example 12 | — | — | — | 0.86 | 25 | — | 100/0 | 75 | 730 | 170 | X uneven |

From Table 1 it is seen that both gel percentage and impact strength are low.

COMPARATIVE EXAMPLE 12

Using ethylene-propylene-diene copolymer rubber (trade name: EP-51, a product of Nippon Synthetic Rubber Co., Ltd.), a molded product was obtained in the same manner as in Example 1 and evaluated for physical properties, results of which are as set out in Table 1. From Table 1 it is seen that although both gel percentage and impact strength are high, the stiffness modulus is very low and the outer surface is uneven and not smooth.

The physical properties set out in Table 1 were measured in the following manner.

(1) Melt Index and Density . . . according to JIS K 6760
(2) Gel Percentage . . . Each molded product was pulverized to pass through 20 mesh, then extracted with xylene at 120° C. for 10 hours and a percent retention was determined as the gel percentage.

What is claimed is:

1. An ethylene copolymer composition for rotational molding, comprising a copolymer of ethylene, 0–3 mole % of an α-olefin and 0.02 to 1% of a non-conjugated diene represented by the following formula (I) or (II) or a derivative thereof:

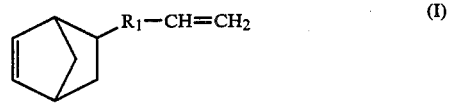   (I)

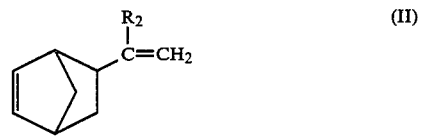   (II)

wherein $R_1$ is an alkylene group having one or two carbon atoms and $R_2$ is hydrogen or an alkyl group having one or two carbon atoms, and an organic peroxide, said copolymer having a melt index of 2 to 50 g/10 min, a density of 0.930 to 0.970 g/cm$^3$ and a maximum peak temperature (Tm) measured according to Differential Scanning Calorimetry (DSC) of not lower than 100° C.

2. An ethylene copolymer composition for rotational molding as claimed in claim 1, wherein said non-conjugated diene is 5-vinyl-2-norbornene.

3. An ethylene copolymer composition for rotational molding as claimed in claim 1, wherein said α-olefin is a $C_3$–$C_{10}$ α-olefin.

4. An ethylene copolymer composition for rotational molding as claimed in claim 1, wherein said organic peroxide is used in an amount of 0.1 to 5 parts by weight per 100 parts by weight of said copolymer.

5. A process for producing a shaped article, characterized by charging a powder of the composition of claim 1 into a mold for rotational molding and then performing a rotational molding.

6. An ethlylene copolymer composition for rotational molding as claimed in claim 1, wherein the amount of said nonconjugated diene is 0.05 to 1.0 mole %.

* * * * *